(12) United States Patent
Ito

(10) Patent No.: US 11,827,058 B2
(45) Date of Patent: Nov. 28, 2023

(54) TIRE

(71) Applicant: Sumitomo Rubber Industries, Ltd., Hyogo (JP)

(72) Inventor: Shunsuke Ito, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 274 days.

(21) Appl. No.: 17/202,039

(22) Filed: Mar. 15, 2021

(65) Prior Publication Data

US 2021/0300121 A1   Sep. 30, 2021

(30) Foreign Application Priority Data

Mar. 26, 2020   (JP) ................. 2020-056419

(51) Int. Cl.
*B60C 11/03*     (2006.01)
*B60C 11/12*     (2006.01)

(52) U.S. Cl.
CPC .......... *B60C 11/0306* (2013.01); *B60C 11/12* (2013.01); *B60C 11/1236* (2013.01); *B60C 2011/0346* (2013.01); *B60C 2011/0353* (2013.01); *B60C 2011/0365* (2013.01);
(Continued)

(58) Field of Classification Search
CPC . B60C 11/0306; B60C 11/12; B60C 11/1236; B60C 11/11; B60C 2011/0346; B60C 2011/0353; B60C 2011/0365; B60C 2011/0381; B60C 2011/0388; B60C 2011/0372
See application file for complete search history.

(56) References Cited

U.S. PATENT DOCUMENTS

2013/0087261 A1* 4/2013 Kageyama .......... B60C 11/1218
                                                152/209.8
2013/0328240 A1* 12/2013 Takahashi .......... B60C 11/1218
                                                264/293
2014/0238567 A1    8/2014 Iwasaki et al.

FOREIGN PATENT DOCUMENTS

EP    2 769 855 A2    8/2014
EP    2 772 370 A2    9/2014
(Continued)

OTHER PUBLICATIONS

Extended European search report issued by the European Patent Office dated Aug. 2, 2021, which corresponds to European Patent Application No. 21159142.5-1012 and is related to U.S. Appl. No. 17/202,039.

*Primary Examiner* — Justin R Fischer
*Assistant Examiner* — Philip N Schwartz
(74) *Attorney, Agent, or Firm* — Studebaker & Brackett PC

(57) ABSTRACT

A tire is provided with a shoulder circumferential groove, a crown circumferential groove, and middle lateral grooves. The middle lateral groove comprises: an axially outer part and an axially inner part which are inclined to the same direction as first inclined portions of the shoulder circumferential groove; and an in-between part which is inclined to the opposite direction to the axially outer part and the axially inner part. The axially outer part is smoothly continuous with the first inclined portion. The groove width WA1 at the axially outer end of the axially outer part is larger than the groove width WA2 at the axially inner end of the axially outer part, and the groove width WB1 at the axially outer end of the axially inner part is larger than the groove width WB2 at the axially inner end of the axially inner part.

20 Claims, 5 Drawing Sheets

(52) U.S. Cl.
CPC .............. *B60C 2011/0372* (2013.01); *B60C 2011/0381* (2013.01); *B60C 2011/0388* (2013.01)

(56) References Cited

FOREIGN PATENT DOCUMENTS

| | | |
|---|---|---|
| JP | 2007-302071 A | 11/2007 |
| JP | 2014-162388 A | 9/2014 |

\* cited by examiner

TIRE

CROSS-REFERENCE TO RELATED APPLICATION

This application claims the benefit of foreign priority to Japanese Patent Application No. 2020-056419 filed 26 Mar. 2020, which is incorporated by reference in its entirety.

TECHNICAL FIELD

The present invention relates to a tire, more particularly to a tread pattern.

BACKGROUND ART

Patent Document 1 below discloses a pneumatic having a tread portion provided with a middle land area defined between a shoulder main groove and a center main groove which extend continuously in the tire circumferential direction.

The middle land area is provided with outer middle lug grooves extending from the shoulder main groove, inner middle lug grooves extending from the center main groove, and narrow circumferential grooves connecting the outer middle lug grooves with the inner middle lug grooves.

Patent Document 1: Japanese Patent Application Publication No. 2014-162388

SUMMARY OF THE INVENTION

Problems to be Solved by the Invention

In recent years, there are increasing demands on vehicles for reducing noise during driving. In the tire disclosed in the Patent Document 1, however, there is room for improvement in noise performance.

The present invention was made in view of the above circumstances, and a main objective of the present invention is to provide a tire in which noise performance can be improved, while maintaining off-road performance.

According to the present invention, a tire comprises:
a tread portion provided with
a shoulder circumferential groove extending continuously in the tire circumferential direction, and
a crown circumferential groove extending in the tire circumferential direction, and adjacently to the shoulder circumferential groove, and
a plurality of middle lateral grooves extending between the shoulder circumferential groove and the crown circumferential groove,
the shoulder circumferential groove extending zigzag and comprising first inclined portions inclined with respect to the tire circumferential direction, and
each of the middle lateral grooves comprising an axially outer part connected to the shoulder circumferential groove, an axially inner part connected to the crown circumferential groove, and an in-between part connecting between the axially outer part and the axially inner part,
wherein
the axially outer part and the axially inner part are inclined in the same direction as the first inclined portions of the shoulder circumferential groove with respect to the tire axial direction,
the in-between part is inclined in the opposite direction to the axially outer part and the axially inner part with respect to the tire axial direction,
the groove width WA1 in the tire circumferential direction measured at the axially outer end of the axially outer part is larger than the groove width WA2 in the tire circumferential direction measured at the axially inner end of the axially outer part, and
the groove width WB1 in the tire circumferential direction measured at the axially outer end of the axially inner part is larger than the groove width WB2 in the tire circumferential direction measured at the axially inner end of the axially inner part,
wherein
the axially outer parts of the middle lateral grooves are smoothly continuous with the respective first inclined portions of the shoulder circumferential groove.

In the tire according to the present invention, it is preferable that, in the plan view of the tread portion, the axially inner part does not overlap with an extension region formed between extensions of the groove edges of the axially outer part which are extended toward the crown circumferential groove at the respective inclination angles at the axially inner ends of the groove edges.

It is preferable that the groove width WB2 of the axially inner part is in a range from 0.7 to 0.9 times the groove width WB1 of the axially inner part.

It is preferable that the length in the tire axial direction of the in-between part is in a range from 0.05 to 0.15 times the length in the tire axial direction of the middle lateral groove.

It is preferable that the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

It is preferable that the angle of the axially outer part with respect to the tire circumferential direction is 70 degrees or more.

It is preferable that a middle land area of the tread portion defined between the crown circumferential groove and the shoulder circumferential groove is provided with sipes extending from the shoulder circumferential groove at an angle of not more than 70 degrees with respect to the tire circumferential direction.

It is preferable that the sipes are not connected to the middle lateral grooves, but connected to the first inclined portions.

It is preferable that the shoulder circumferential groove comprises
second inclined portions inclining with respect to the tire axial direction to a direction opposite to the first inclined portions, and
circumferential portions extending in the tire circumferential direction and connecting between the first inclined portions and the second inclined portions.

It is preferable that the tread portion is provided with shoulder lateral grooves extending from the shoulder circumferential groove toward a tread edge, and
the shoulder lateral grooves are smoothly continuous with the respective second inclined portions of the shoulder circumferential groove.

It is preferable that the groove width WA2 of the axially inner part is in a range from 0.7 to 0.9 times the groove width WA1 of the axially inner part.

DESCRIPTION OF THE PREFERRED EMBODIMENTS

An embodiment of present invention will now be described in detail in conjunction with accompanying drawings.

Figure 1:
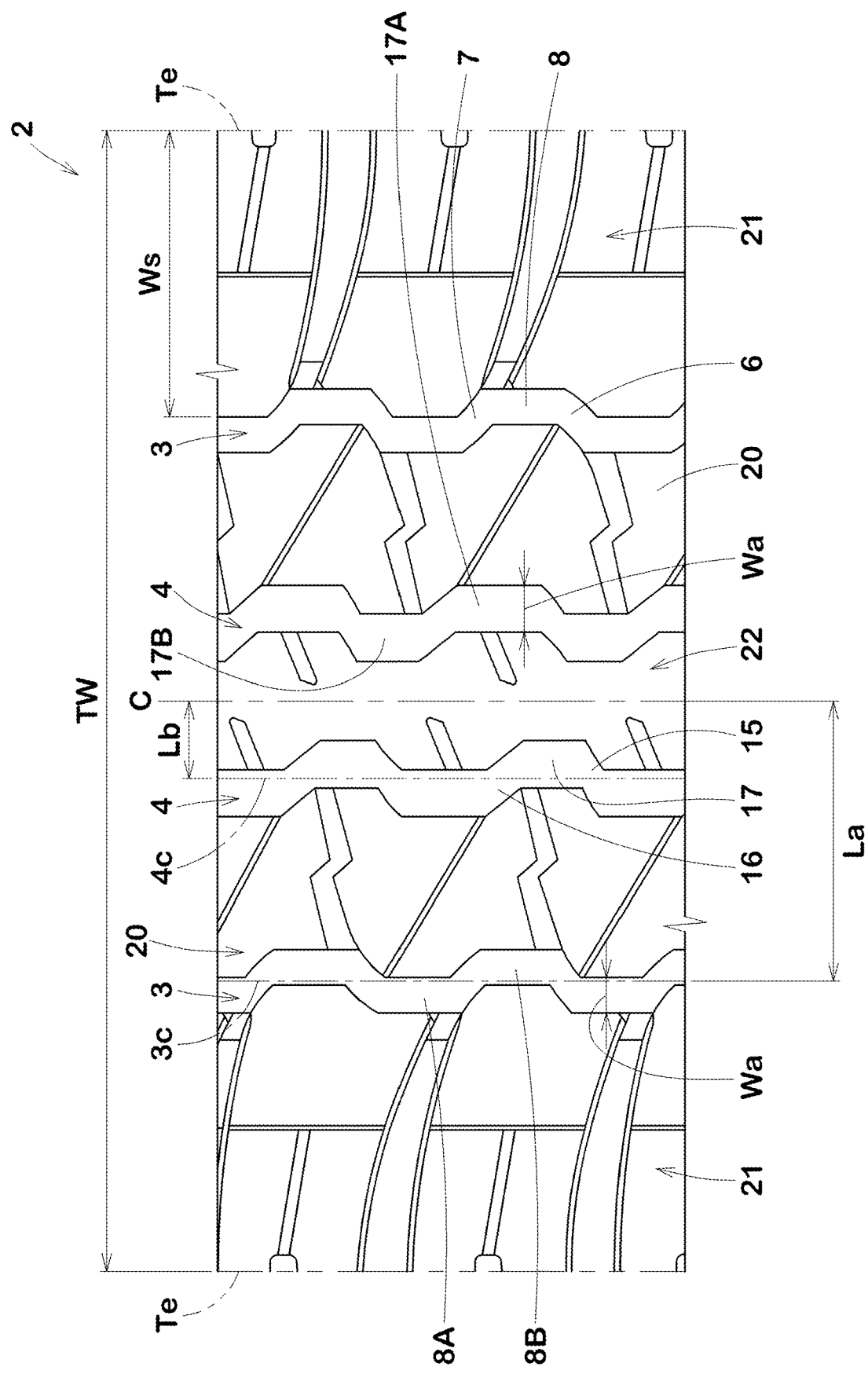
FIGS. 1-2 show a developed partial plan view of a tread portion of a tire as an embodiment of the present invention differently annotated.
Figure 2:
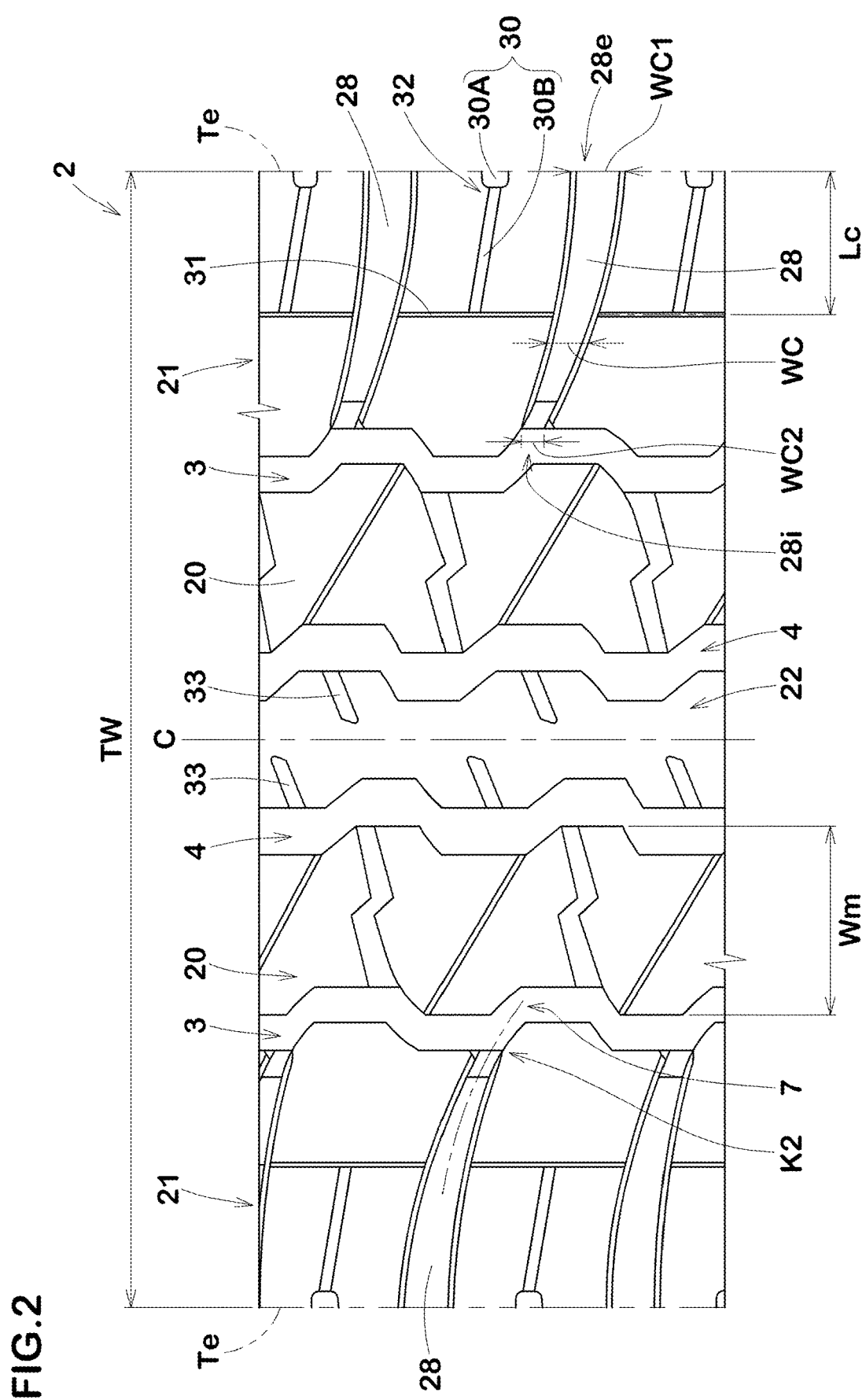

FIGS. 1-2 shows a part of a tread portion 2 of a pneumatic tire 1 as an embodiment of the present invention.

The present invention can be suitably applied to tires for passenger cars, particularly sport utility vehicles (SUVs) having many opportunities to drive off-road such as muddy areas as well as paved roads. However, the present invention may be also applied to heavy-duty tires and tires of other categories.

As shown in FIGS. 1-2, the tread portion 2 is provided, on each side of the tire equator C, with a shoulder circumferential groove 3, a crown circumferential groove 4, and a plurality of middle lateral grooves 5.

The shoulder circumferential groove 3 extends continuously in the tire circumferential direction in a zigzag manner.

The crown circumferential groove 4 extends in the tire circumferential direction. The crown circumferential groove 4 in this embodiment is a zigzag groove adjacent to the shoulder circumferential groove 3 and extending continuously in the tire circumferential direction.

The middle lateral grooves 5 extend from the shoulder circumferential groove 3 to the crown circumferential groove 4.

The shoulder circumferential groove 3 comprises first inclined portions 6 which are inclined (downward to the left in FIGS. 3-5) with respect to the tire circumferential direction. The shoulder circumferential groove 3 further comprises: second inclined portions 7 which are inclined with respect to the tire circumferential direction in the opposite direction to the first inclined portions 6 (downward to the right in FIG. 1); and circumferential portions 8 extending in the tire circumferential direction and connecting between the first inclined portions 6 and the second inclined portions 7.

Each of the middle lateral grooves 5 is composed of an axially outer part 10 connected to the shoulder circumferential groove 3, an axially inner part 11 connected to the crown circumferential groove 4, and an in-between part 12 connecting between the axially outer part 10 and the axially inner part 11.

Figure 3:
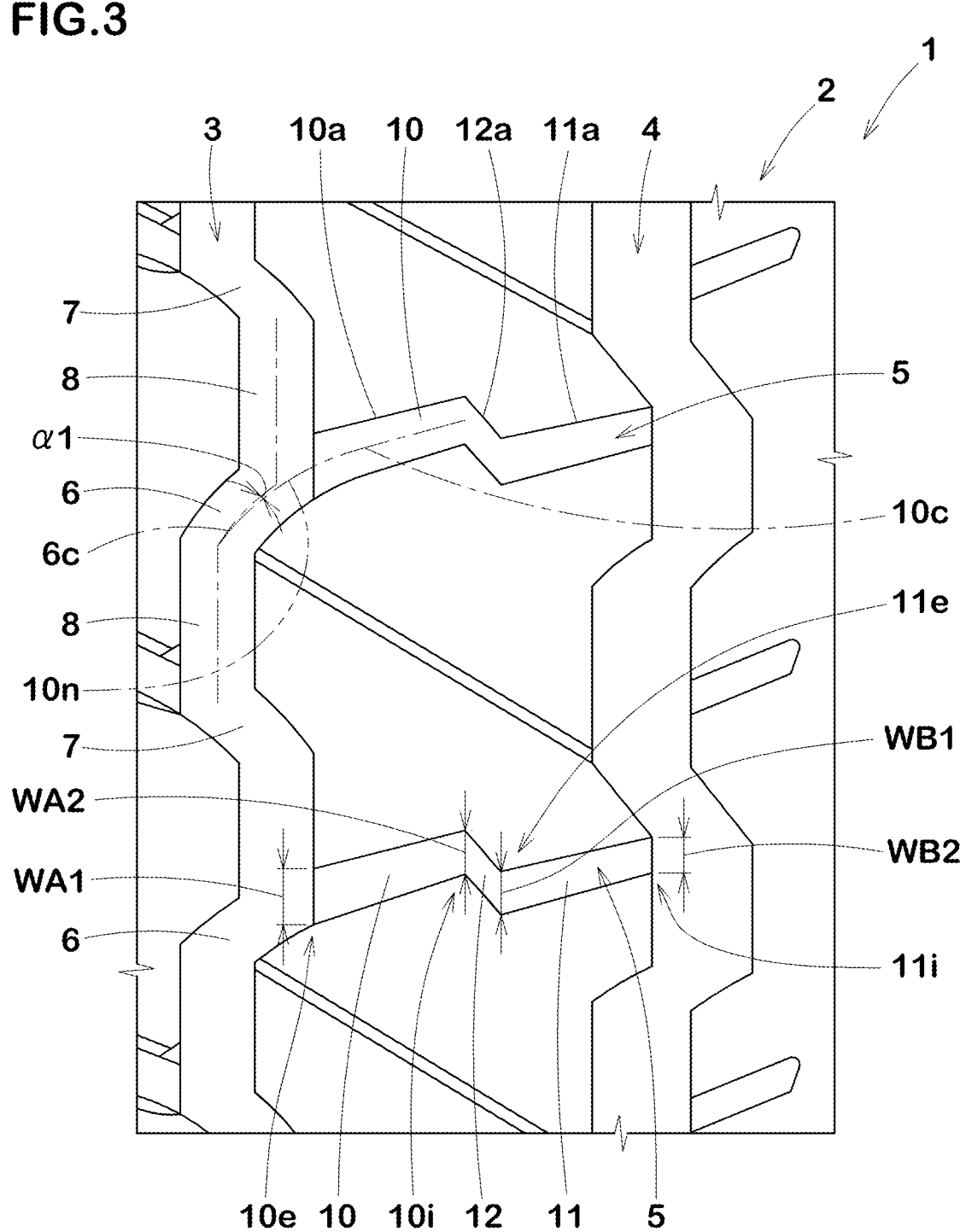
FIGS. 3-5 show an enlarged partial top view of a middle land area of the tread portion differently annotated.
Figure 4:
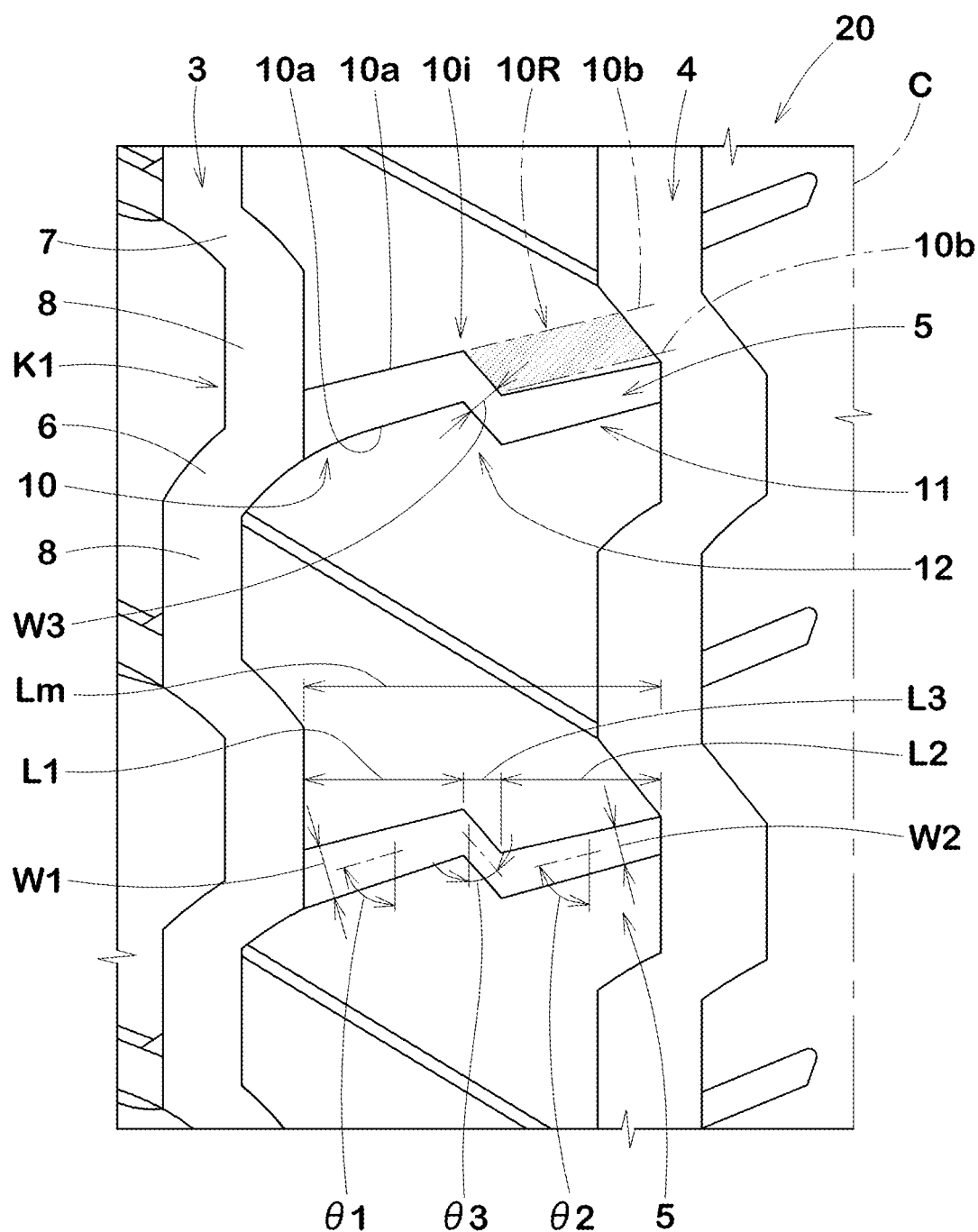
Figure 5:
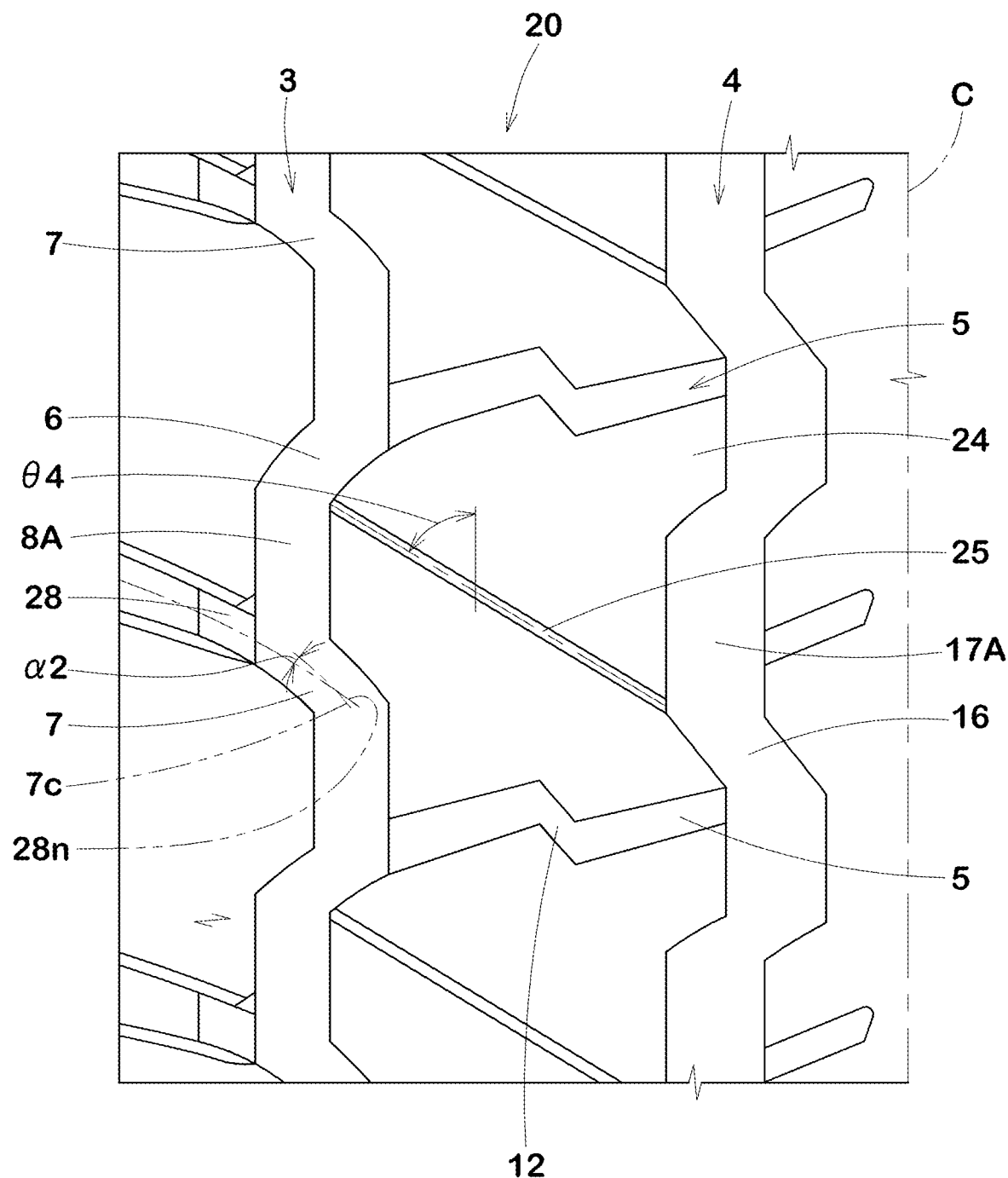

The axially outer part 10 and the axially inner part 11 are inclined in the same direction as the first inclined portions 6 with respect to the tire axial direction (downward to the left in FIGS. 3-5).

The in-between part 12 is inclined in the opposite direction to the axially outer part 10 and the axially inner part 11 with respect to the tire axial direction.

As a result, when the middle lateral grooves 5 come into contact with the ground during running, the timing at which the groove edges 10a to 12a of the parts 10 to 12 come into contact with the road surface is dispersed. Therefore, the impact sound caused by the middle lateral grooves 5 is reduced.

The axially outer part 10 is inclined in the same direction as the first inclined portions 6 over the entire length between the axially outer end 10e and the axially inner end 10i of the axially outer part 10.

The axially inner part 11 is inclined in the same direction as the first inclined portions 6 over the entire length between the axially outer end 11e and the axially inner end 11i of the axially inner part 11.

The in-between part 12 is inclined in the opposite direction to the first inclined portions 6 (downward to the right in FIG. 1) over the entire length between the axially inner end 10i of the axially outer part 10 and the axially outer end 11e of the axially inner part 11.

The axially outer parts 10 are smoothly continuous with the respective first inclined portions 6 of the shoulder circumferential groove 3. As a result, large traction is exhibited by the axially outer part 10 and the first inclined portion 6.

Here, the expression "smoothly continuous" means that the intersection angle $\alpha 1$ (FIG. 3) between the groove center line 6c of the first inclined portion 6 and a virtual line 10n obtained by extending the groove center line 10c of the axially outer part 10 toward the first inclined portion 6, is not more than 10 degrees.

The groove width WA1 in the tire circumferential direction measured at the axially outer end 10e of the axially outer part 10 is set to be larger than the groove width WA2 in the tire circumferential direction measured at the axially inner end 10i of the axially outer part 10.

As a result, mud and the like entered in the axially outer part 10 are smoothly discharged toward the shoulder circumferential groove 3.

In general, the axially inner part 11 may be subjected to a ground pressure higher than that of the axially outer part 10, and it is considered that the vibration of the air in the axially inner part 11 becomes larger than the vibration of the air in the axially outer part 10. Therefore, in order to improve the noise performance, it is important to reduce the resonance sound in the axially inner part 11. In the present embodiment, therefore, the groove width WB1 in the tire circumferential direction at the axially outer end 11e of the axially inner part 11 is formed larger than the groove width WB2 in the tire circumferential direction at the axially inner end 11i of the axially inner part 11.

As a result, the relatively loud resonance sound from the axially inner part 11 is suppressed from propagating to the crown circumferential groove 4, and the resonance sound caused by the middle lateral grooves 5 is reduced.

FIGS. 1 and 2 show a developed partial view of the tread portion 2 between its tread edges Te.

Here. the tread edges Te are the axial outermost edges of the ground contacting patch of the tire which occurs under a normally inflated loaded condition when the camber angle of the tire is zero.

The undermentioned tread width TW is the width measured under a normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

The shoulder circumferential groove 3 is axially outermost or most close to the tread edge Te among the circumferential grooves 3 and 4.

In this embodiment, circumferential grooves extending continuously in the tire circumferential direction are the shoulder circumferential groove 3 and the crown circumferential groove 4 which are disposed on each side of the tire equator C.

In the present embodiment, the first inclined portions 6 of the shoulder circumferential groove 3 extend while curving convexly toward the outside in the tire axial direction.

In the present embodiment, the second inclined portions 7 of the shoulder circumferential groove 3 extend while curving convexly toward the inside in the tire axial direction.

In the present embodiment, the circumferential portions 8 extend linearly. The circumferential portions 8 include axially outer circumferential portions 8A and axially inner circumferential portions 8B which are arranged alternately in the tire circumferential direction.

In this embodiment, the circumferential portions 8 are longer than the first inclined portions 6 and the second inclined portions 7 when their lengths are measured along the respective widthwise center lines.

Such zigzag shoulder circumferential groove 3 can prevent the occurrence of resonance of air in the shoulder circumferential groove 3, therefore, noise performance can be improved.

The configurations of the first inclined portions 6, the second inclined portions 7 and the circumferential portions 8 are not limited to the above described example.

The crown circumferential groove 4 of the present embodiment extends continuously in the tire circumferential direction in a zigzag manner.

The crown circumferential groove 4 is composed of crown first inclined portions 15, crown second inclined portions 16 and crown circumferential portions 17.

The crown first inclined portions 15 are inclined with respect to the tire circumferential direction to one side in the tire axial direction which is the same as the first inclined portions 6 of the shoulder circumferential groove 3.

The crown second inclined portions 16 are inclined with respect to the tire circumferential direction to one side in the tire axial direction which is opposite to the crown first inclined portions 15.

The crown circumferential portions 17 include axially outer crown circumferential portions 17A and axially inner crown circumferential portions 17B which are arranged alternately in the tire circumferential direction.

The crown circumferential portions 17 extend along the tire circumferential direction and connect between the crown first inclined portions 15 and the crown second inclined portions 16.

The crown circumferential portions 17 are longer than, the crown first inclined portions 15 and the crown second inclined portions 16 when their lengths are measured along the respective widthwise center lines.

The configurations of the crown first inclined portions 15, the crown second inclined portions 16 and the crown circumferential portions 17 are not limited to the above described example.

Although not particularly limited, the groove width Wa of the shoulder circumferential groove 3 and the groove width Wa of the crown circumferential groove 4 are preferably set in a range from 2.5% to 6.5% of the tread width TW in this example. And the groove depth of the shoulder circumferential groove 3 and the groove depth of the crown circumferential groove 4 are preferably set in a range from 8.0 to 10.0 mm in this example.

The zigzag-amplitude center line $3c$ (shown in FIG. 1) of the shoulder circumferential groove 3 is positioned at a distance La in the tire axial direction from the tire equatorial line C, and the distance La is preferably set in a range from 20% to 30% of the tread width TW.

The zigzag-amplitude center line $4c$ (shown in FIG. 1) of the crown circumferential groove 4 is positioned at a distance Lb in the tire axial direction from the tire equatorial line C, and the distance Lb is preferably set in a range from 3% to 10% of the tread width TW.

Since the tread portion 2 is provided, on each side of the tire equator C, with the shoulder circumferential groove 3 and the crown circumferential groove 4, the tread portion 2 is divided into a pair of middle land areas 20 between the shoulder circumferential grooves 3 and the crown circumferential grooves 4, a pair of shoulder land areas 21 between the shoulder circumferential grooves 3 and the adjacent tread edges Te, and a crown land area 22 between the two crown circumferential grooves 4.

As to the groove width of the middle lateral groove 5 measured in the tire circumferential direction, it is preferable that, as shown in FIG. 3, the groove open width WB2 at the axially outer end of the axially inner part 11 is set in a range from 0.7 to 0.9 times the groove width WB1 at the axially inner end of the axially inner part 11. When the groove open width WB2 is not less than 0.7 times the groove width WB1, mud and the like in the axially inner part 11 can be smoothly discharged toward the crown circumferential groove 4. When the groove open width WB2 is not more than 0.9 times the groove width WB1, it is possible to suppress the resonance sound in the axially inner part 11 from propagating to the crown circumferential groove 4.

In order to effectively derive these advantageous effects, it is also preferable for the axially outer part 10 that, as shown in FIG. 3, the groove width WA2 at the axially inner end of the axially outer part 10 is set in a range from 0.7 to 0.9 times the groove open width WA1 at the axially outer end of the axially outer part 10.

Preferably, the groove open width WA1 is set in a range from 30% to 50% of the length of the axially outer part 10.

Generally, the axially outer part 10 is subjected to a lateral force larger than the axially inner part 11 during cornering. In order to effectively discharge mud and the like entered in the middle lateral grooves 5 toward the shoulder circumferential grooves 3 by utilizing such lateral force, the groove width WA1 of the axially outer part 10 is larger than the groove width WB1 of the axially inner part 11 in the present embodiment. And the groove width WA2 of the axially outer part 10 is larger than the groove width WB2 of the axially inner part 11 in the present embodiment.

Preferably, the groove width WA2 of the axially outer part 10 is smaller than the groove width WB1 of the axially inner part 11.

FIG. 4 shows a part of the ground contacting top surface of the middle land area 20 of the present embodiment.

As shown, in the top view of the middle land area 20, the axially inner part 11 does not overlap with a virtual extension region 10R (area shaded by fine dot pattern) which is defined between two extensions 10b of the two groove edges 10a of the axially outer part 10 which are extended toward the crown circumferential groove 4 at the inclination angles of the groove edges 10a at the respective ends 10i. As a result, the occurrence of the resonance sound in the middle lateral groove 5 can be prevented.

Preferably, the angle θ1 of the widthwise center line of the axially outer part 10 with respect to the tire circumferential direction is set to be not less than 70 degrees in order to exert high traction during off-road running. For that purpose, the angle θ1 is more preferably not less than 75 degrees. However, the angle θ1 is preferably smaller than 90 degrees, more preferably not more than 85 degrees in order to reduce the resonance sound.

The axially outer part 10 and the shoulder circumferential groove 3 form a T-shaped intersection K1. The T-shaped intersection K1 means that there is no lateral groove extending into the shoulder land area 21 from a position in the tire circumferential direction of the shoulder circumferential groove 3 at which the axially outer part 10 is opened to the shoulder circumferential groove 3, wherein the "lateral groove" refers to a groove whose axial length is not less than 20% of the maximum axial width Ws (shown in FIG. 1) of the shoulder land area 21.

Preferably, the angle θ2 of the widthwise center line of the axially inner part 11 with respect to the tire circumferential direction is such that the difference from the angle θ1, namely, the absolute value |θ2−θ1| of the difference between θ2 and θ1, is not more than 10 degrees, more preferably not more than 5 degrees. Such axially inner part 11 balances the rigidity of the middle land area 20 between both sides in the tire axial direction to maintain high off-road performance. In order to effectively derive the above-described effect, it is preferred that the length L1 in the tire axial direction of the axially outer part 10 is substantially the same as the length L2 in the tire axial direction of the axially inner part 11. The expression "substantially the same" means that the ratio (L1/L2) of the length L1 to the length L2 is in a range between 0.80 and 1.25.

It is preferable that the length L3 in the tire axial direction of the in-between part 12 is set in a range from 0.05 to 0.15 times the length Lm in the tire axial direction of the middle lateral grooves 5. Since the length L3 is not less than 0.05 times the length Lm, the resonance sound in the in-between part 12 can be greatly reduced. Since the length L3 is not more than 0.15 times the length Lm, mud and the like in the middle lateral grooves 5 can be smoothly discharged.

More preferably, the length L3 is not less than 0.07 times, but not more than 0.12 times the length Lm.

It is preferable that the width W3 of the in-between part 12 measured perpendicularly to the longitudinal direction of the in-between part 12 is smaller than the width W1 of the axially outer part 10 measured perpendicularly to the longitudinal direction of the axially outer part 10, and also smaller than the width W2 of the axially inner part 11 measured perpendicularly to the longitudinal direction of the axially inner part 11. Thereby, the effect of reducing the resonance sound is enhanced.

Preferably, the width W3 is not less than 60%, more preferably not less than 65%, but not more than 80%, more preferably not more than 75% of the width W2.

In order to improve the noise performance while maintaining excellent off-road performance, it is preferred that the angle θ3 (FIG. 4) of the widthwise center line of the in-between part 12 with respect to the tire circumferential direction is not more than 60 degrees, more preferably not more than 55 degrees, even more preferably not more than 50 degrees.

By the middle lateral grooves 5, each of the middle land areas 20 is circumferentially divided into middle blocks 24.

In the present embodiment, each of the middle land areas 20 is provided with sipes 25 extending from the shoulder circumferential groove 3. The sipes 25 reduces the stiffness of the middle land areas 20 and reduces the impact sound caused by the middle lateral grooves 5 edges.

Here, the term "sipe" means a narrow groove having a groove width of less than 1.5 mm inclusive of a cut having no substantial width.

In each of the middle land areas 20, the sipes 25 are disposed between the middle lateral grooves 5 in order that the rigidity of the middle land area 20 does not become insufficient and excellent off-road performance can be maintained.

The angle θ4 (FIG. 5) of each sipe 25 with respect to the tire circumferential direction is preferably set to be not more than 70 degrees in order that the sipe 25 has a relatively large circumferential extent, and thereby the rigidity of the middle block 24 is reduced in a relatively large region in the tire circumferential direction, and the impact sound from the middle lateral grooves 5 can be reduced to improve the noise performance. However, in order to suppress an excessive decrease in the rigidity of the middle block 24, the angle θ4 of the sipe 25 is preferably set to be not less than 40 degrees.

In this embodiment, the sipes 25 extend from the shoulder circumferential groove 3 to the crown circumferential groove 4, namely, extend across the entire width of the respective middle land areas 20.

As shown in FIG. 5, each of the sipes 25 extends between the position of an intersection of the first inclined portions 6 and the outer circumferential portions 8A, and the position of an intersection of the crown second inclined portions 16 and the crown outer probe portions 17A.

In this embodiment, all the sipes 25 are inclined in the same direction as the in-between part 12 with respect to the tire axial direction.

The shoulder land areas 21 are each provided with shoulder lateral grooves 28 extending from the shoulder circumferential grooves 3 to the tread edges Te as shown in FIG. 2.

The shoulder lateral grooves 28 are smoothly continuous with the respective second inclined portions 7 of the shoulder circumferential grooves 3. As a result, large traction is exhibited by the shoulder lateral grooves 28 and the second inclined portions 7.

Here, the expression "smoothly continuous" means that the intersection angle α2 (FIG. 5) between the groove center line 7c of the second inclined portion 7 and a virtual line 28n obtained by extending the groove center line of the shoulder lateral groove 28 toward the second inclined portion 7, is not more than 10 degrees.

The shoulder lateral groove 28 and the shoulder circumferential groove 3 form a T-shaped intersection K2. The T-shaped intersection K2 means that there is no lateral groove extending into the middle land area 20 from a position in the tire circumferential direction of the shoulder circumferential groove 3 at which the shoulder lateral groove 28 is opened to the shoulder circumferential groove 3, wherein the "lateral groove" refers to a groove whose axial length is not less than 20% of the maximum axial width Wm (shown in FIG. 2) of the middle land area 20.

In this embodiment, as shown in FIG. 2, the width WC of the shoulder lateral groove 28 measured in the tire circumferential direction, is continuously increased from the shoulder circumferential groove 3 to the tread edge Te. Preferably, the width WC2 in the tire circumferential direction measured at the axially inner end 28$i$ of the shoulder lateral groove 28 is set in a range from 0.25 to 0.50 times the width WC1 in the tire circumferential direction measured at the axially outer end 28$e$ (at the tread edge Te) of the shoulder lateral groove 28 in order to keep off-road performance high.

In the present embodiment, the shoulder land areas 21 are each provided with short shoulder lateral grooves 30 and circumferential sipes 31.

The circumferential sipes 31 each extend in the tire circumferential direction from one of the shoulder lateral grooves 28 to the next shoulder lateral groove 28.

The short shoulder lateral grooves 30 extend axially inwardly from the respective tread edges Te and terminate within the respective shoulder land areas 21.

Each of the short shoulder lateral grooves 30 is composed of a wide outer portion 30A extending axially inwardly from the tread edge Te, and a narrow inner portion 30B extending axially inwardly from the outer portion 30A and connected to a central portion of the circumferential sipe 31.

The narrow inner portion 30B has a groove width smaller than that of the wide outer portion 30A.

Between the outer portion 30A and the inner portion 30B, there is formed a widening portion 32 where the groove width changes rapidly.

In the present embodiment, it is preferable that the distance Lc in the tire axial direction from the tread edge Te to each of the circumferential sipes 31 is in a range of from 7% to 18% of the tread width TW.

In the present embodiment, the crown land area 22 is provided with crown lateral grooves 33 extending from the crown circumferential grooves 4 toward the tire equator C and terminating within the crown land area 22.

The crown lateral grooves 33 in this example are terminated without reaching the tire equator C.

While detailed description has been made of a preferable embodiment of the present invention, the present invention can be embodied in various forms without being limited to the illustrated embodiment. For example, the crown circumferential groove 4 in the above-described embodiment extends continuously in the tire circumferential direction, but the crown circumferential groove may be formed intermittently.

Comparison Tests

Based on the tread pattern shown in FIG. 1, pneumatic tires for passenger cars were experimentally manufactured as test tires and tested for the noise performance and off-road performance. Specifications of the test tires are shown in Table 1. The common specifications and test methods are as follows.

<Noise Performance Test>

The test tires were installed on all wheels of a test car (3000 cc sport-utility vehicle). Then, during running on a dry asphalt road surface of a test course, the test driver evaluated running noise generated from the tires.

The results are shown in Table 1 by an index based on Comparative Example 1 being 100, wherein the higher the number, the better the noise performance.

tire size: 265/55R19
rim size: 7.5 J
tire pressure: 200 kPa
WA2=WB1
WA1=20% of Lm <Off-Road Performance Test>

The above-mentioned test car was ran in a muddy area of a test course, and the test driver evaluated the steering stability and traction performance.

The results are shown in Table 1 by an index based on Comparative Example 1 being 100, wherein the higher the number, the better the off-road performance.

TABLE 1

| Tire | Comparative Example 1 | Comparative Example 2 | Ex.1 | Ex.2 | Ex.3 | Ex.4 | Ex.5 |
|---|---|---|---|---|---|---|---|
| WA2/WA1 | 1.0 | 0.8 | 0.8 | 0.6 | 0.7 | 0.9 | 0.8 |
| WB2/WB1 | 1.0 | 0.8 | 0.8 | 0.6 | 0.7 | 0.9 | 0.8 |
| α1 (degree) | 10 | 10 | 10 | 10 | 10 | 10 | 10 |
| inclinations of axially outer part and in-between part *1 | O | S | O | O | O | O | O |
| axially inner part and virtual extension region 10R *2 | N | O | N | N | N | N | O |
| noise performance | 100 | 95 | 110 | 115 | 110 | 110 | 105 |
| off-road performance | 100 | 105 | 105 | 100 | 105 | 105 | 108 |

*1) "O" opposite, "S" same
*2) "O" overlap, "N" not overlap

From the test results, it was confirmed that the tires according to the present invention were improved in the noise performance without sacrificing the off-road performance.

REFERENCE SIGN LIST 1 tire
3 shoulder circumferential groove
4 crown circumferential groove
5 middle lateral grooves
6 first inclined portions
10 axially outer part
10$e$ outer end of axially outer part 10*i* inner end of axially outer part
11 axially inner part
11*e* outer end of axially inner part
11*i* inner end of axially inner part

The invention claimed is:

1. A tire comprising:
a tread portion provided with
a shoulder circumferential groove extending continuously in the tire circumferential direction, and
a crown circumferential groove extending in the tire circumferential direction, and adjacently to the shoulder circumferential groove, and
a plurality of middle lateral grooves extending between the shoulder circumferential groove and the crown circumferential groove,
the shoulder circumferential groove extending zigzag and comprising first inclined portions each comprising a pair of groove edges that are inclined in the same direction with respect to the tire circumferential direction, and
each of the middle lateral grooves comprising an axially outer part connected to the shoulder circumferential groove, an axially inner part connected to the crown circumferential groove, and an in-between part connecting between the axially outer part and the axially inner part,
wherein
the axially outer part and the axially inner part are inclined in the same direction as the first inclined portions with respect to the tire axial direction,
the in-between part is inclined in the opposite direction to the axially outer part and the axially inner part with respect to the tire axial direction,
the groove width WA1 in the tire circumferential direction measured at the axially outer end of the axially outer part is larger than the groove width WA2 in the tire circumferential direction measured at the axially inner end of the axially outer part, and
the groove width WB1 in the tire circumferential direction measured at the axially outer end of the axially inner part is larger than the groove width WB2 in the tire circumferential direction measured at the axially inner end of the axially inner part,
wherein
the axially outer parts of the middle lateral grooves are smoothly continuous with the respective first inclined portions of the shoulder circumferential groove such that an intersection angle $\alpha 1$ between the groove center line of each of the first inclined portions and a virtual line obtained by extending the groove center line of one of the axially outer parts toward an adjacent one of the first inclined portions is not more than 10 degrees.

2. The tire according to claim 1, wherein
the groove width WB2 is in a range from 0.7 to 0.9 times the groove width WB1.

3. The tire according to claim 1, wherein
the length in the tire axial direction of the in-between part is in a range from 0.05 to 0.15 times the length in the tire axial direction of the middle lateral groove.

4. The tire according to claim 2, wherein
the length in the tire axial direction of the in-between part is in a range from 0.05 to 0.15 times the length in the tire axial direction of the middle lateral groove.

5. The tire according to claim 2, wherein
the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

6. The tire according to claim 3, wherein
the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

7. The tire according to claim 1, wherein
the angle of the axially outer part with respect to the tire circumferential direction is 70 degrees or more.

8. The tire according to claim 1, wherein
a middle land area of the tread portion defined between the crown circumferential groove and the shoulder circumferential groove is provided with sipes extending from the shoulder circumferential groove at an angle of not more than 70 degrees with respect to the tire circumferential direction.

9. The tire according to claim 8, wherein
the sipes are not connected to the middle lateral grooves, but connected to the first inclined portions.

10. The tire according to claim 9, wherein
the shoulder circumferential groove comprises
second inclined portions inclining with respect to the tire axial direction to a direction opposite to the first inclined portions, and
circumferential portions extending in the tire circumferential direction and connecting between the first inclined portions and the second inclined portions.

11. The tire according to claim 10, wherein
the tread portion is provided with shoulder lateral grooves extending from the shoulder circumferential groove toward a tread edge, and
the shoulder lateral grooves are smoothly continuous with the respective second inclined portions of the shoulder circumferential groove.

12. The tire according to claim 11, wherein
the groove width WA2 of the axially inner part is in a range from 0.7 to 0.9 times the groove width WA1 of the axially inner part.

13. A tire comprising:
a tread portion provided with
a shoulder circumferential groove extending continuously in the tire circumferential direction,
a crown circumferential groove extending in the tire circumferential direction, and adjacently to the shoulder circumferential groove, and
a plurality of middle lateral grooves extending between the shoulder circumferential groove and the crown circumferential groove,
the shoulder circumferential groove extending zigzag and comprising first inclined portions inclined with respect to the tire circumferential direction, and
each of the middle lateral grooves comprising an axially outer part connected to the shoulder circumferential groove, an axially inner part connected to the crown circumferential groove, and an in-between part connecting between the axially outer part and the axially inner part, wherein
the axially outer part and the axially inner part are inclined in the same direction as the first inclined portions with respect to the tire axial direction,
the in-between part is inclined in the opposite direction to the axially outer part and the axially inner part with respect to the tire axial direction,
the groove width WA1 in the tire circumferential direction measured at the axially outer end of the axially outer part is larger than the groove width WA2 in the tire circumferential direction measured at the axially inner end of the axially outer part, and
the groove width WB1 in the tire circumferential direction measured at the axially outer end of the axially inner part is larger than the groove width WB2 in the tire circumferential direction measured at the axially inner end of the axially inner part,
wherein
the axially outer parts of the middle lateral grooves are smoothly continuous with the respective first inclined portions of the shoulder circumferential groove, and
in the plan view of the tread portion, the axially inner part does not overlap with an extension region formed between extensions of the groove edges of the axially outer part which are extended toward the crown circumferential groove at the respective inclination angles at the axially inner ends of the groove edges.

14. The tire according to claim 13, wherein the groove width WB2 is in a range from 0.7 to 0.9 times the groove width WB1.

15. The tire according to claim 13, wherein the length in the tire axial direction of the in-between part is in a range from 0.05 to 0.15 times the length in the tire axial direction of the middle lateral groove.

16. The tire according to claim 14, wherein the length in the tire axial direction of the in-between part is in a range from 0.05 to 0.15 times the length in the tire axial direction of the middle lateral groove.

17. The tire according to claim 13, wherein the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

18. The tire according to claim 14, wherein the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

19. The tire according to claim 15, wherein the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

20. A tire comprising:
a tread portion provided with
a shoulder circumferential groove extending continuously in the tire circumferential direction,
a crown circumferential groove extending in the tire circumferential direction, and adjacently to the shoulder circumferential groove, and
a plurality of middle lateral grooves extending between the shoulder circumferential groove and the crown circumferential groove,
the shoulder circumferential groove extending zigzag and comprising first inclined portions inclined with respect to the tire circumferential direction, and
each of the middle lateral grooves comprising an axially outer part connected to the shoulder circumferential groove, an axially inner part connected to the crown circumferential groove, and an in-between part connecting between the axially outer part and the axially inner part,
wherein
the axially outer part and the axially inner part are inclined in the same direction as the first inclined portions with respect to the tire axial direction,
the in-between part is inclined in the opposite direction to the axially outer part and the axially inner part with respect to the tire axial direction,
the groove width WA1 in the tire circumferential direction measured at the axially outer end of the axially outer part is larger than the groove width WA2 in the tire circumferential direction measured at the axially inner end of the axially outer part, and
the groove width WB1 in the tire circumferential direction measured at the axially outer end of the axially inner part is larger than the groove width WB2 in the tire circumferential direction measured at the axially inner end of the axially inner part,
wherein
the axially outer parts of the middle lateral grooves are smoothly continuous with the respective first inclined portions of the shoulder circumferential groove, and
the width of the in-between part measured in the direction orthogonal to the longitudinal direction of the in-between part is smaller than the width of the axially inner part measured in the direction orthogonal to the longitudinal direction of the axially inner part, and smaller than the width of the axially outer part in the direction orthogonal to the longitudinal direction of the axially outer part.

* * * * *